(12) United States Patent
Itakura et al.

(10) Patent No.: US 8,102,615 B2
(45) Date of Patent: Jan. 24, 2012

(54) DATA STORAGE APPARATUS

(75) Inventors: Akihiro Itakura, Kawasaki (JP);
Toshikazu Kanaoka, Kawasaki (JP)

(73) Assignee: Toshiba Storage Device Corporation, Tokyo (JP)

( * ) Notice: Subject to any disclaimer, the term of this patent is extended or adjusted under 35 U.S.C. 154(b) by 484 days.

(21) Appl. No.: 12/409,636

(22) Filed: Mar. 24, 2009

(65) Prior Publication Data

US 2009/0244756 A1    Oct. 1, 2009

(30) Foreign Application Priority Data

Mar. 31, 2008  (JP) .................................. 2008-089080

(51) Int. Cl.
*G11B 5/09* (2006.01)

(52) U.S. Cl. .................. 360/51; 360/39; 360/48; 360/52

(58) Field of Classification Search .................... 360/31, 360/39, 48, 51, 52, 61; 369/275.3
See application file for complete search history.

(56) References Cited

U.S. PATENT DOCUMENTS

| | | | |
|---|---|---|---|
| 6,252,845 B1 * | 6/2001 | Hino et al. ................ | 369/275.3 |
| 6,708,307 B1 * | 3/2004 | Massoudi ................... | 714/775 |
| 6,887,652 B2 * | 5/2005 | Hino et al. ................. | 430/321 |
| 6,891,689 B2 * | 5/2005 | Taguchi et al. ............. | 360/51 |
| 7,002,883 B2 * | 2/2006 | Nakamura et al. ........ | 369/47.22 |

FOREIGN PATENT DOCUMENTS

| | | |
|---|---|---|
| JP | 2003-157507 | 5/2003 |
| JP | 2006-164349 | 6/2006 |

OTHER PUBLICATIONS

Korean Office Action for corresponding Korean patent application 10-2009-0026526, issued on Aug. 31, 2010.

* cited by examiner

*Primary Examiner* — Kevin M Picardat
(74) *Attorney, Agent, or Firm* — Staas & Halsey LLP

(57) ABSTRACT

A data storage apparatus includes: a medium for storing data having synchronization marks and data blocks, the synchronization mark and the data block being allocated alternately in the circumference direction of the medium; a head writing data into or reading out data from the medium; and a processor for executing a process including: reading out synchronization marks, measuring time for the head to pass through each of the data blocks based on signals read out from each of the synchronization marks in the circumference direction, generating write/read clock for each of the data blocks, which is continuously changing in speed, by calculating difference in time for the head to pass through the each one of the data blocks and its adjacent one of the blocks on the basis of the time measured, and writing data into or reading out data from the medium in synchronization with the write/read clock.

11 Claims, 10 Drawing Sheets

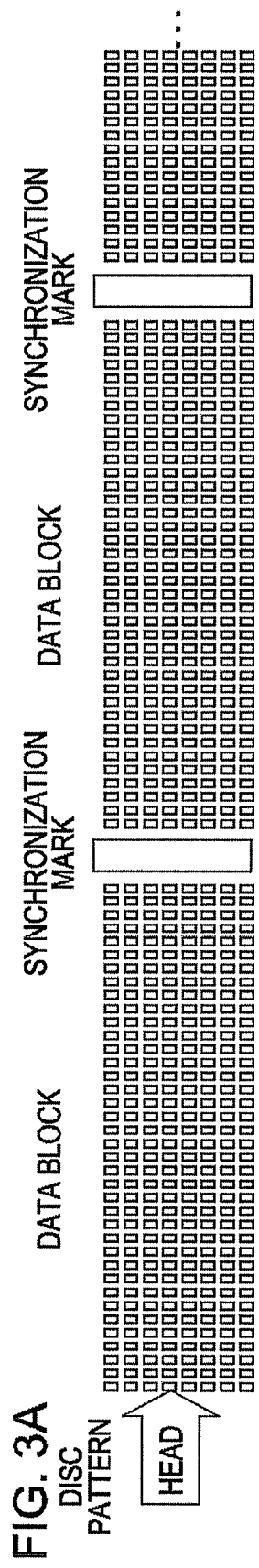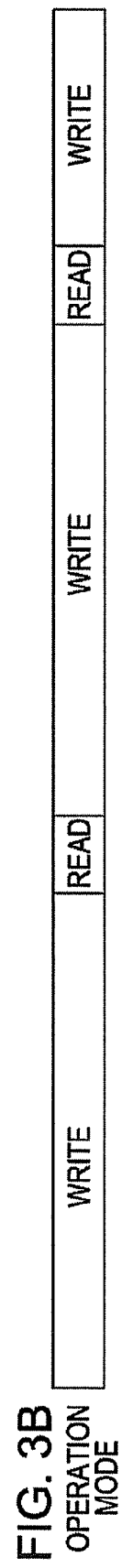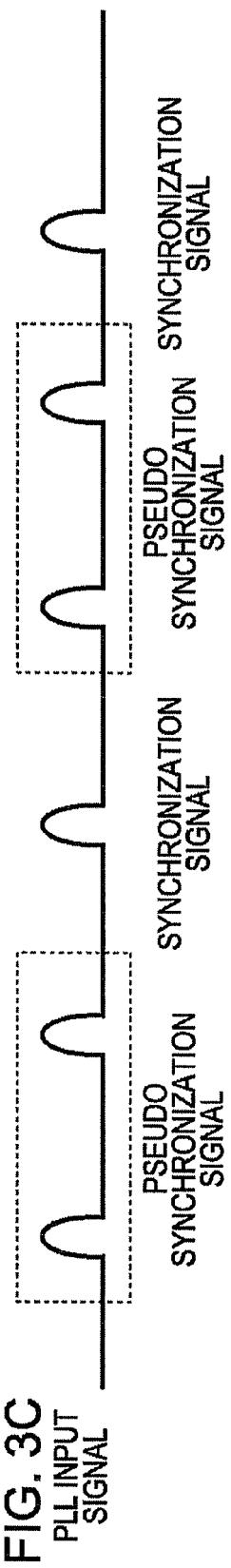
FIG. 3A DISC PATTERN
FIG. 3B OPERATION MODE
FIG. 3C PLL INPUT SIGNAL

DATA STORAGE APPARATUS

CROSS-REFERENCE TO RELATED APPLICATION

This application is based upon and claims the benefit of priority of the prior Japanese Patent Application No. 2008-089080, filed on Mar. 31, 2008, the entire contents of which are incorporated herein by reference.

FIELD

The embodiments discussed herein are related to a data storage apparatus.

BACKGROUND

A patterned media recording have attracted attention as a high-density technology of a magnetic disk device. A magnetized area having an island shape (hereinafter, referred to as land) is formed on a patterned media disk. It is important for the magnetic disk device to match the timing of a recording magnetic field to the land when recording is performed.

Note that as for a conventional technique, there is a magnetic recording medium equipped with a synchronization area for a write timing between predetermined number of sequence bits (wiring area) and other predetermined number of sequence bits, and a recording device that generates a write clock from a signal read from the synchronization area. A technique related to the above techniques is discussed in Japanese Laid-open Patent Publication No. 2003-157507.

High accuracy write timing is important to write data into the patterned media. In order to obtain high synchronization accuracy, it is preferable that the aforementioned predetermined number is small. In this case, the synchronization area is increased and format efficiency (recording capacity) is reduced.

SUMMARY

According to an aspect of the invention, an apparatus for storing data includes: a medium for storing data having a plurality of synchronization marks and a plurality of data blocks, the synchronization mark and the data block being allocated alternately in the direction of the circumference of the medium; a head including a read element for reading out data stored in the medium and a write element for writing data into the medium; and a processor for executing a process including: reading out synchronization marks of the medium, measuring time for the head to pass through each of the data blocks on the basis of signals read out from each of the synchronization marks in the direction of the circumference of the medium, generating write/read clock for each of the data blocks, which is at least in part continuously changing in speed, by calculating difference in time for the head to pass through the each one of the data blocks and its adjacent one of the blocks on the basis of the time measured, and writing data into or reading out data from the medium in synchronization with the write/read clock generated.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIGS. 3A, FIG. 3B, and FIG. 3C are a conceptual diagram showing an example of a write clock correction processing of the magnetic disk device according to the first embodiment.

DESCRIPTION OF EMBODIMENTS

Embodiments of the invention will be explained with reference to accompanying drawings.

First Embodiment

First, a structure of a magnetic disk device (data storage apparatus) according to the embodiment will be described.

Figure 1:
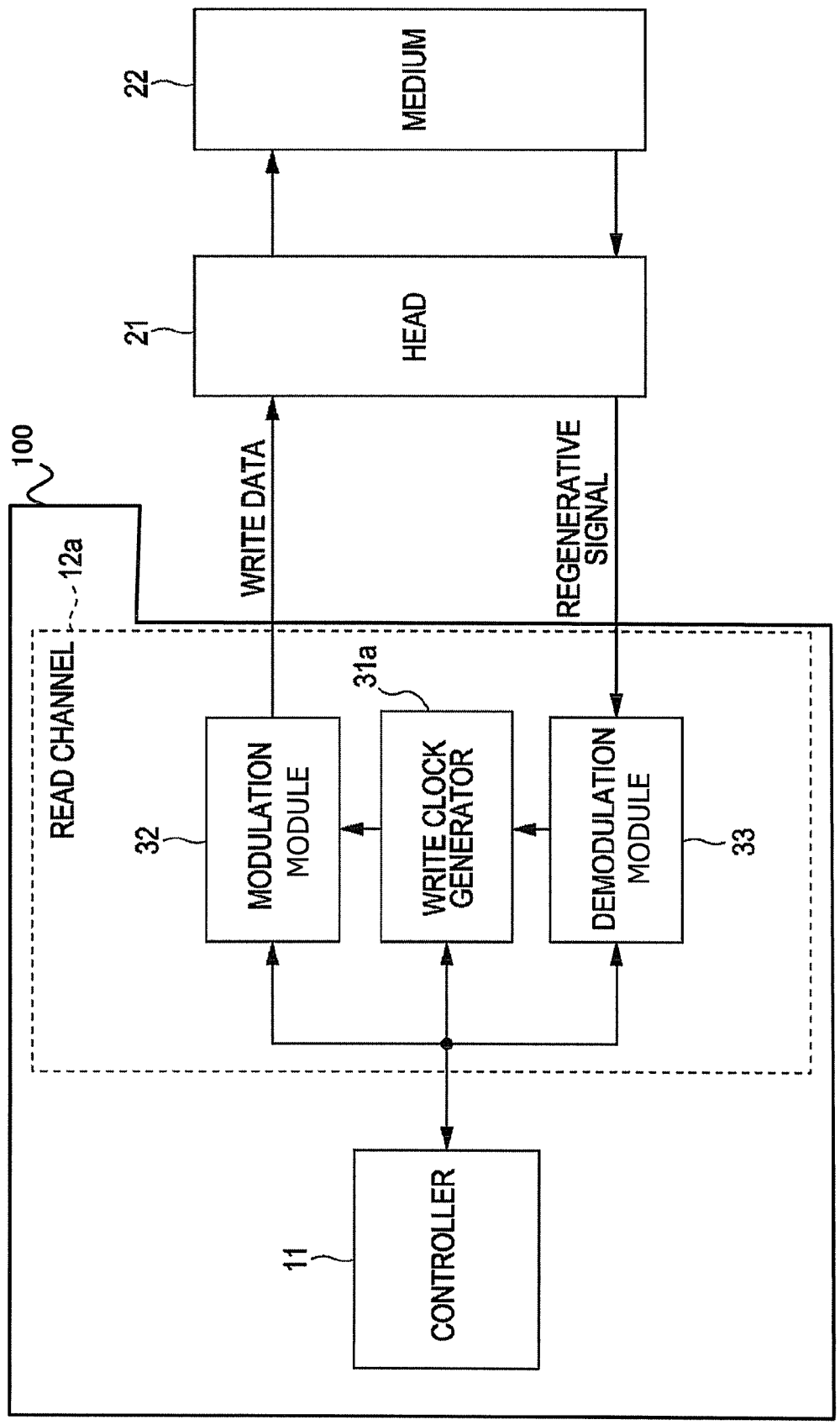
FIG. 1 is a block diagram showing an example of a structure of a magnetic disk device according to a first embodiment.

FIG. 1 is a block diagram showing an example of a structure of the magnetic disk device according to the first embodiment. The magnetic disk device includes a controller 11 (measuring module, calculating module), a read channel 12a, a head 21, and a disk 22 (recording medium). The controller 11 performs communication with a host and a control of the read channel 12a. The disk 22 is a patterned media. The head 21 performs read and right with respect to the disk 22.

The read channel 12a includes a write clock generator 31a (generating module), a modulation module 32, and a demodulation module 33. The modulation module 32 modulates the data from the controller 11 and outputs a modulated result to the head 21. The demodulation module 33 performs waveform equalization and demodulation of a regenerative signal from the head 21 and outputs a demodulated result to the controller 11. The controller 11 and the read channel 12a may be integrated as a processor 100.

Figure 2:
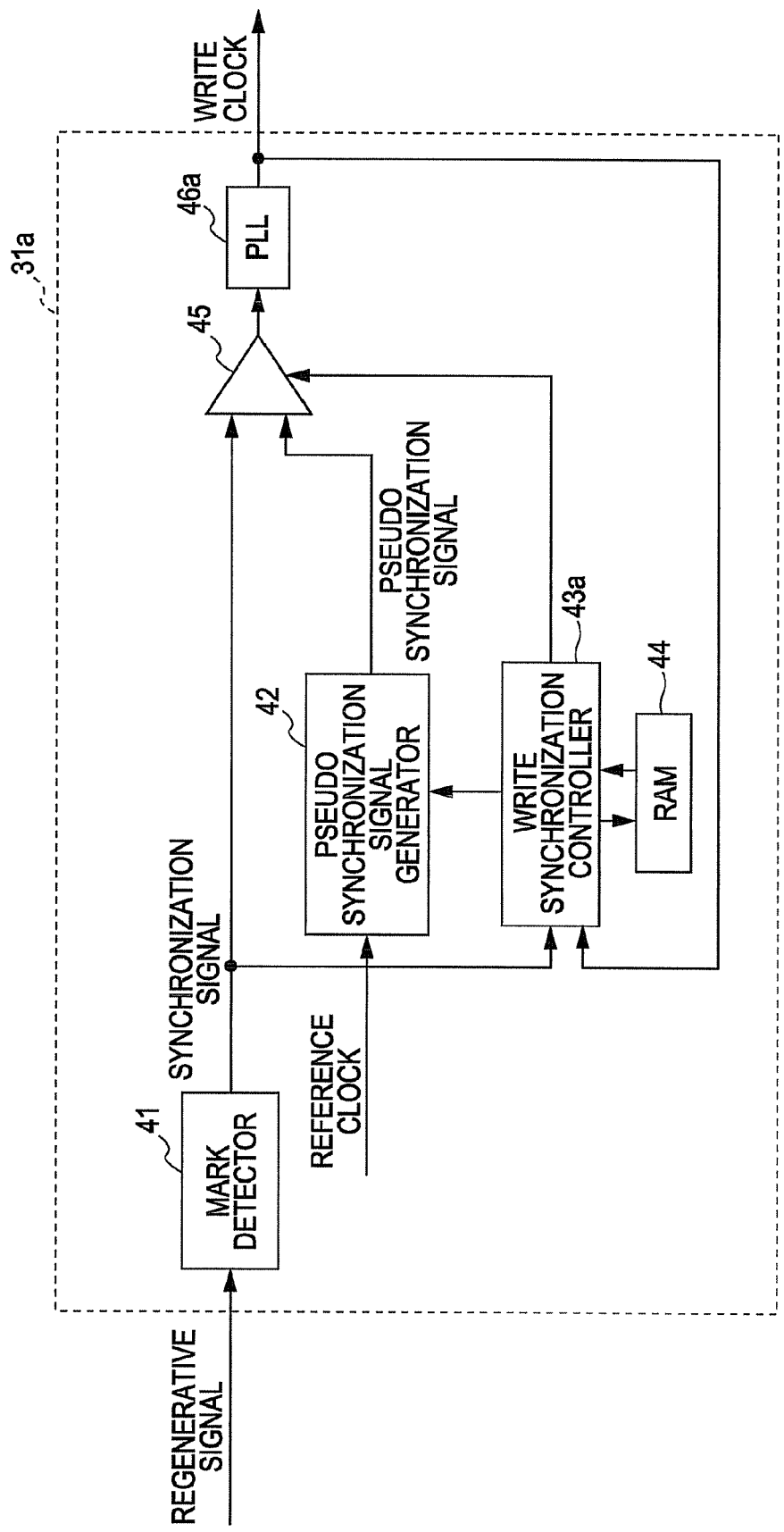
FIG. 2 is a block diagram showing an example of a structure of a write clock generator according to the first embodiment.

FIG. 2 is a block diagram showing an example of a structure of the write clock generator 31a according to the first embodiment. The write clock generator 31a includes a mark detector 41, a pseudo synchronization signal generator 42, a write synchronization controller 43a, a RAM (Random Access Memory) 44, a selector 45, and a PLL (Phase Locked Loop) 46a.

Next, an outline of a write clock correction processing in a write processing of the magnetic disk device according to the embodiment will be described.

The write processing is a processing for writing write data in the disk 22. The write clock correction processing is a processing for correcting a write clock for executing writing. FIGS. 3A to 3C are a conceptual diagram showing an example of the write clock correction processing of the magnetic disk device according to the first embodiment.

FIG. 3A is a layout drawing showing a disk pattern on the disk 22 in a track direction. The medium for storing data includes a plurality of synchronization marks and a plurality of data blocks. The synchronization mark and the data block are allocated alternately in the direction of the circumference of the medium. In FIG. 3A, a relative position of the head 21 with respect to the disk pattern moves from left to right. Further, the disk pattern has data blocks each of which is an assemblage of lands (data dot alignment) and synchronization marks that are read for synchronization. The synchronization mark is inserted between the data blocks having a predetermined length.

Further, FIG. 3B is a timing chart showing a variation of an operation mode corresponding to the relative position of the head 21 on the disk pattern of FIG. 3A. Herein, the operation mode when the head 21 is positioned on the data block is a write mode, and the operation mode when the head 21 is positioned on the synchronization mark is a read mode.

Further, FIG. 3C is a timing chart showing a waveform of a PLL input signal (signal output from the selector 45 and input to the PLL 46a) corresponding to the operation mode of FIG. 3B. In the write mode, the PLL input signal includes a synchronization signal (first pulse) that is a pulse generated at a timing of the synchronization mark that is read by the head 21 and a pseudo synchronization signal (second pulse) that is a pulse generated between the synchronization signal. In the embodiment, the pulse of the pseudo synchronization signal shall be generated at a timing of (M−1) except the timing of the synchronization signal among the timings that are obtained by equally dividing the interval of the synchronization signal into M. The PLL 46a generates the write clock so as to synchronize to the synchronization signal and the pseudo synchronization signal.

Next, a variation measurement processing of the magnetic disk device according to the embodiment will be described.

The magnetic disk device according to the embodiment preliminarily performs a variation measurement processing for measuring a frequency variation caused by eccentricity of the disk 22, a high-order variation due to a process, or the like. The timing at which the variation measurement processing is performed is a time of factory default, time before an initial write processing, time when power source is turned on, time when a predetermined time is passed, time after detecting a large impact (because, eccentricity condition is changed by the impact), or the like.

Figure 4A:
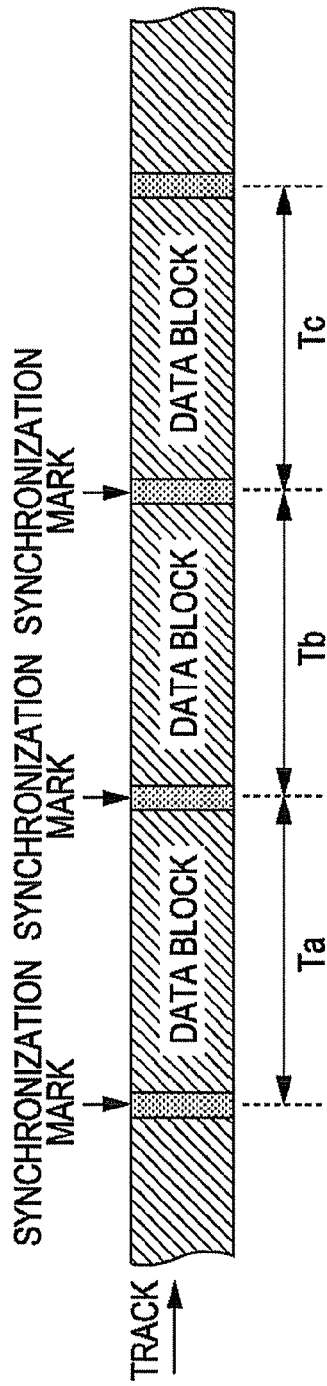
FIG. 4A and FIG. 4B are a conceptual diagram showing an example of a variation measurement processing of the magnetic disk device according to the first embodiment.
Figure 4B:
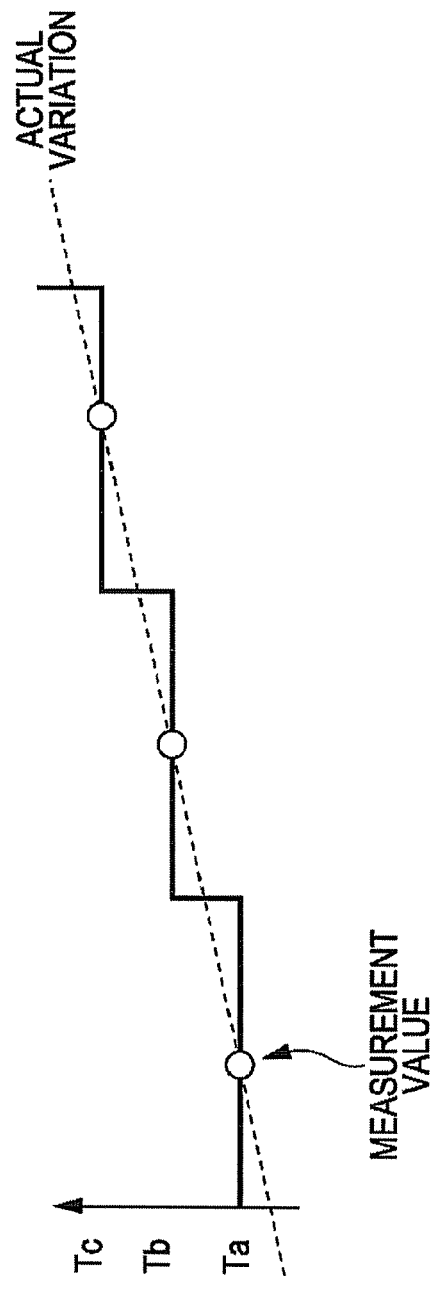

FIGS. 4A and 4B are a conceptual diagram showing an example of the variation measurement processing of the magnetic disk device according to the first embodiment. FIG. 4A shows a disk pattern on the disk 22 in the track direction. The disk pattern has data blocks and synchronization marks similarly to FIG. 3A. Further, FIG. 4B shows measurement values Ta, Tb, and Tc of data block times that are measured for every data block. The data block time is the length between the synchronization marks (data block).

Figure 5:
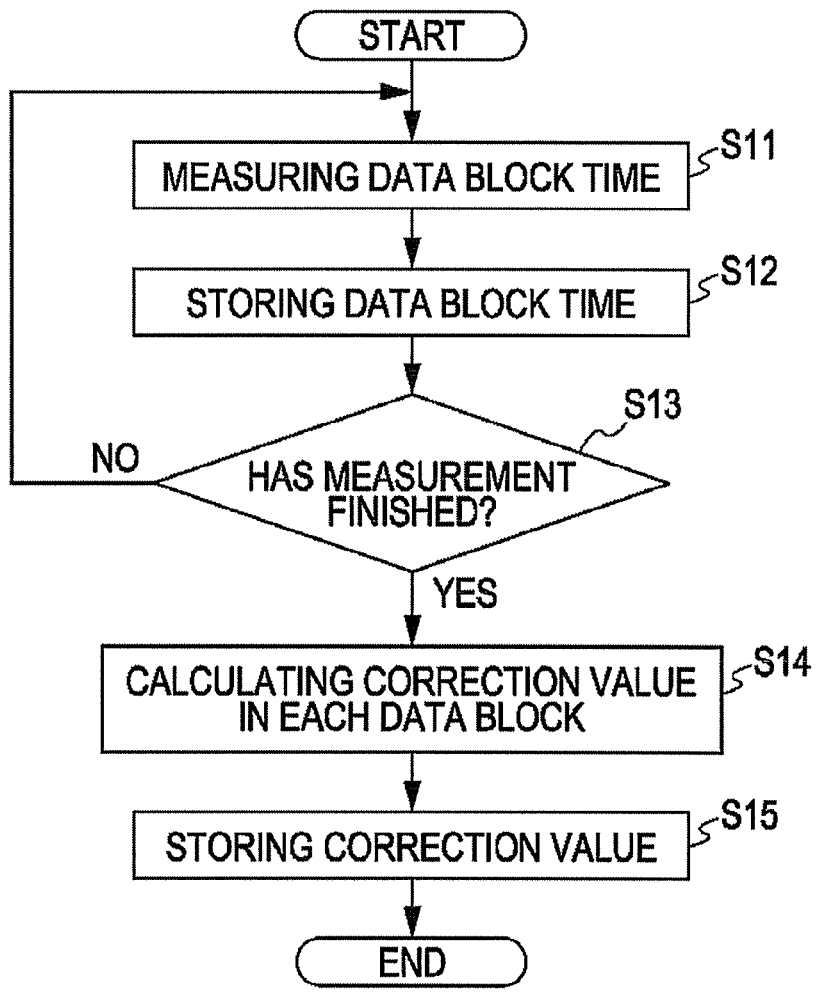
FIG. 5 is a flow chart showing an example of the variation measurement processing of the magnetic disk device according to the first embodiment.

FIG. 5 is a flow chart showing an example of the variation measurement processing of the magnetic disk device according to the first embodiment.

First, the controller 11 measures the data block time for every data block in a predetermined track (S11). The controller 11, for example functions as the measuring module for regenerating synchronization marks in the track, and measuring a time at which the head scans a data block between the synchronization marks to set the time as a measurement value for every data block. Herein, the controller 11 measures the data block time to set the data block time as the measurement value by counting the clock of a predetermined frequency. The controller 11, for example functions as the calculating module for calculating a setting value of a recording clock for a plurality of timings in each data block based on the measurement values for the plurality of data blocks measured by the measuring module. Another example, the controller 11 functions as the measuring module for measuring for the head to pass through each of the data blocks on the basis of signals read out from each of the synchronization marks in the direction of the circumference of the medium. Next, the controller 11 stores the measurement value in the RAM 44 (S12).

Figure 6:
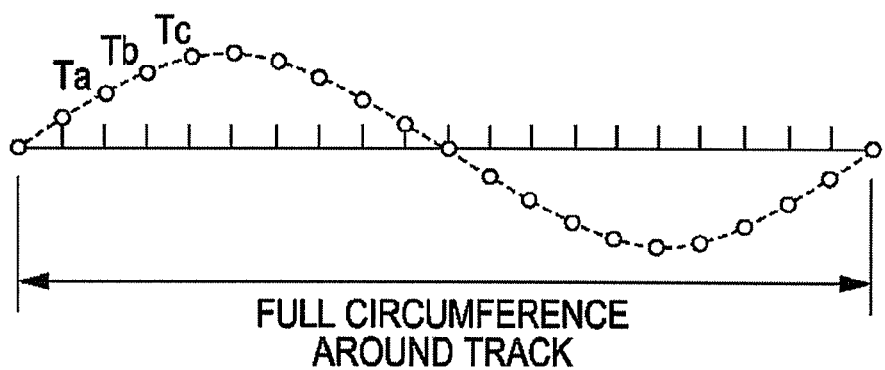
FIG. 6 is a conceptual diagram showing an example of a measurement result of the variation measurement processing of the magnetic disk device according to the first embodiment.

FIG. 6 is a conceptual diagram showing an example of a result measured by the variation measurement processing of the magnetic disk device according to the first embodiment. In FIG. 6, the lateral axis shows the position of the data block, and the vertical axis shows the data block time. Further, FIG. 6 shows the variation of the data block time corresponding to a full circumference around the track. Further FIG. 6 shows the measurement values Ta, Tb, and Tc illustrated in FIGS. 4A and 4B.

Next, the controller 11 performs judgment of whether the measurement of the data block time corresponding to the full circumference around the track is finished or not (S13). When the measurement is not finished (No in S13), the processing goes back to S11, and the next data block time is measured. On the other hand, when the measurement is finished (Yes in S13), the controller 11 predicts a variation in each data block from the variation of the measurement value, calculates a correction value of the phase of a pseudo synchronization signal in each data block (S14), and stores the correction value in the RAM 44 as a correction table (S15), and the flow is finished.

Herein, the controller 11 predicts the variation of the measurement value (write clock frequency) in the data block of a target by using the measurement value of the data block that is the target for calculating the correction value and the measurement value of the data blocks before and behind the data block of the target. Further, herein, synchronization of the PLL 46a is performed for every (M−1) pulse of the pseudo synchronization signal in the data block, so that the controller 11 calculates (M−1) number of correction values in each data block.

Next, the write processing of the magnetic disk device according to the embodiment will be described.

Figure 7:
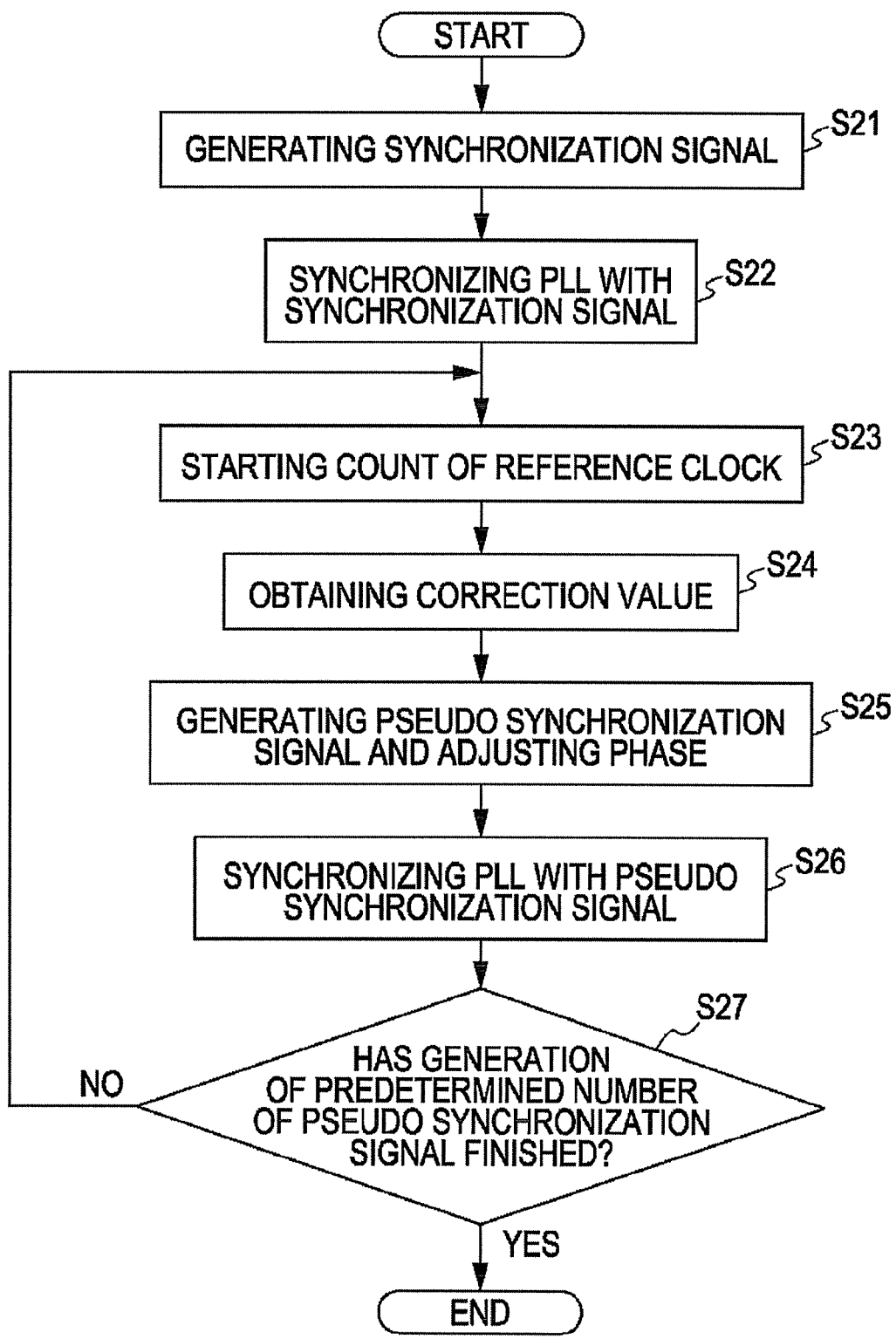
FIG. 7 is a flow chart showing an example of a write processing of the magnetic disk device according to the first embodiment.

FIG. 7 is a flow chart showing an example of the write processing of the magnetic disk device according to the first embodiment. First, the mark detector 41 is set to the read mode for the track that is the target of the write processing, and the mark detector 41 detects the synchronization mark from the regenerative signal and generates the pulse of the synchronization signal, and the mark detector 41 is set to the write mode (S21). Next, the write synchronization controller 43a selects the synchronization signal by the selector 45 and inputs to the PLL 46a, and synchronizes the PLL 46a with the pulse of the synchronization signal (S22).

Next, the pseudo synchronization signal generator 42 starts counting of a reference clock for a pseudo synchronization signal generating timing (S23). Next, the pseudo synchronization signal generator 42 obtains the correction value from the correction table in the RAM 44 (S24). Next, the pseudo synchronization signal generator 42 generates a pulse of the pseudo synchronization signal when the count value is reached to a predetermined count value and perfumes the adjustment of the phase of the pulse in accordance with the correction value (S25). The predetermine count value is the value obtained by equally dividing the data block time by M. The controller may function as a generator for generating write/read clock for each of the data blocks, which is at least in part continuously changing in speed, by calculating difference in time for the head to pass through the each one of the data blocks and its adjacent one of the blocks on the basis of the time measured. The head writes data into or reads out data from the medium in synchronization with the write/read clock generated.

Next, the write synchronization controller 43a selects the pseudo synchronization signal by the selector 45 to input to the PLL 46a, and synchronizes the PLL 46a with a pulse of the pseudo synchronization signal (S26). Next, the write synchronization controller 43a performs judgment of whether or not the generation of the predetermined number (M−1) of the pseudo synchronization signal is finished (S27). When the generation of the pseudo synchronization signal is not finished (No in S27), the processing goes back to S23, and generation of the next pseudo synchronization signal is performed. When the generation of the pseudo synchronization signal is finished (Yes in S27), the flow is finished and the flow is performed again.

The pseudo synchronization generator 42 performs the phase adjustment of the pseudo synchronization signal by using the correction table. However, the pseudo synchronization generator 42 may perform the phase adjustment by using calculation. In this case, the controller 11 stores a parameter of a relational expression that expresses a relation between the position of the data block and the correction value of the frequency and the phase of the write clock into the RAM 44 based on the measured data block time. Further, the pseudo synchronization signal generator 42 calculates the correction value from the position of the data block by using the relational expression and performs the phase adjustment of the pseudo synchronization signal. The relational expression may be an expression in which all of variations are organized, or may be expressions that are separated for every variation factor or variation frequency. When expressions that are separated are used, eccentricity that is a first-order variation and a high-order variation such as a process origination are separated.

Further, in the embodiment, the correction value is stored in the RAM 44. However, the correction value may be stored in a nonvolatile memory or a system area of the disk 22. In this case, the variation measurement processing can be reduced as the correction value is stored even after the power source of the magnetic disk device is cut off.

According to the embodiment, synchronization accuracy can be improved without increasing the number of the synchronization mark, that is, without deteriorating format efficiency by generating the pseudo synchronization signal similar to the synchronization signal by predicting frequency variation of the write clock in the data block. The magnetic disk device may satisfy both synchronization accuracy and format efficiency.

Second Embodiment

First, a structure of a magnetic disk device (data storage apparatus) according to the embodiment will be described.

Figure 8:
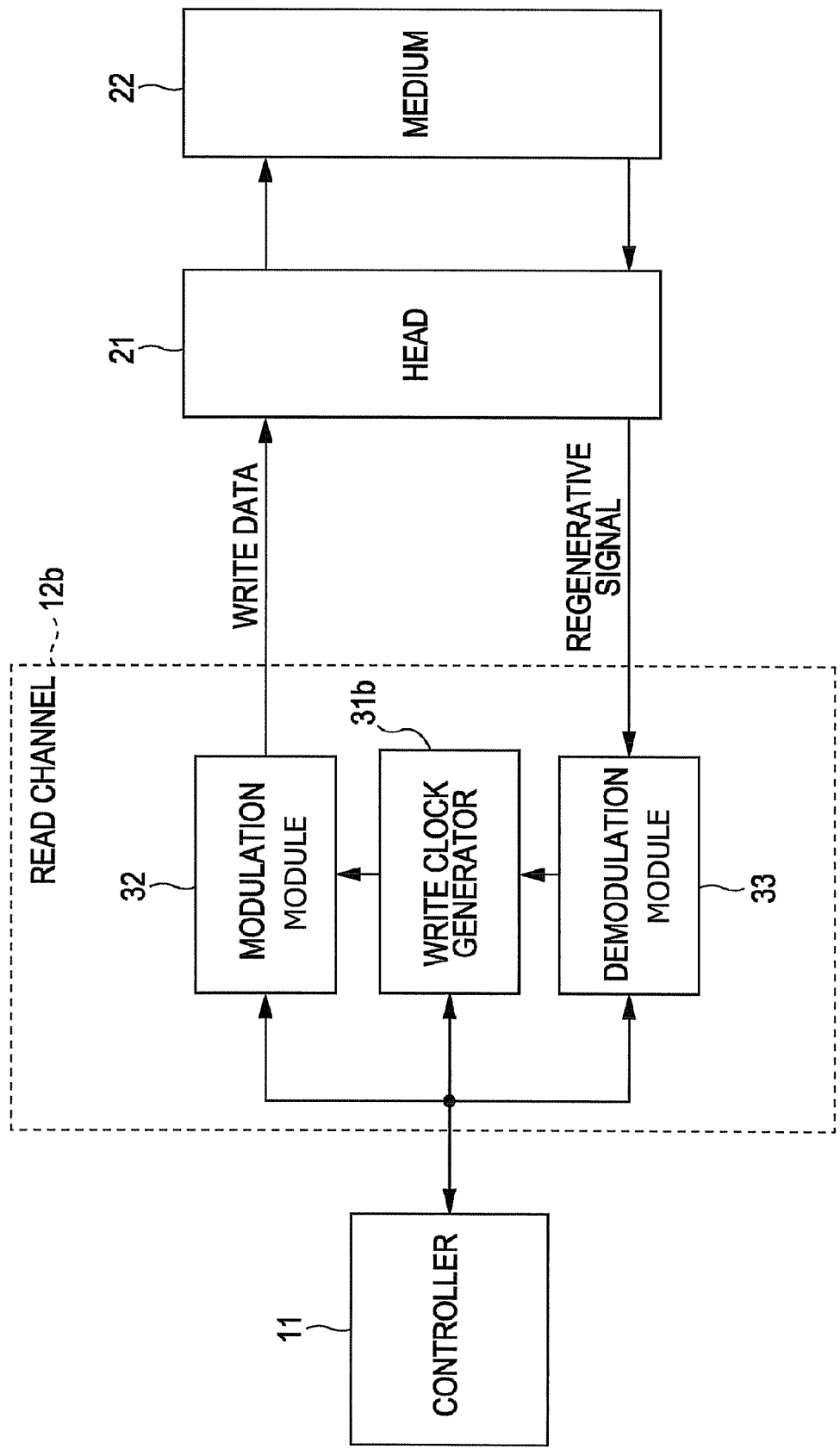
FIG. 8 is a block diagram showing an example of a structure of a magnetic disk device according to a second embodiment.

FIG. 8 is a block diagram showing an example of a structure of the magnetic disk device according to the second embodiment. In FIG. 8, the same reference numeral as in FIG. 1 denotes the same or equivalent element illustrated in FIG. 1, so that the description thereof will be omitted here. The magnetic disk device in FIG. 8 includes a read channel 12b in stead of the read channel 12a as compared with the magnetic disk device of FIG. 1. The read channel 12b includes a write clock generator 31b in stead of the write clock generator 31a as compared with the read channel 12b.

Figure 9:
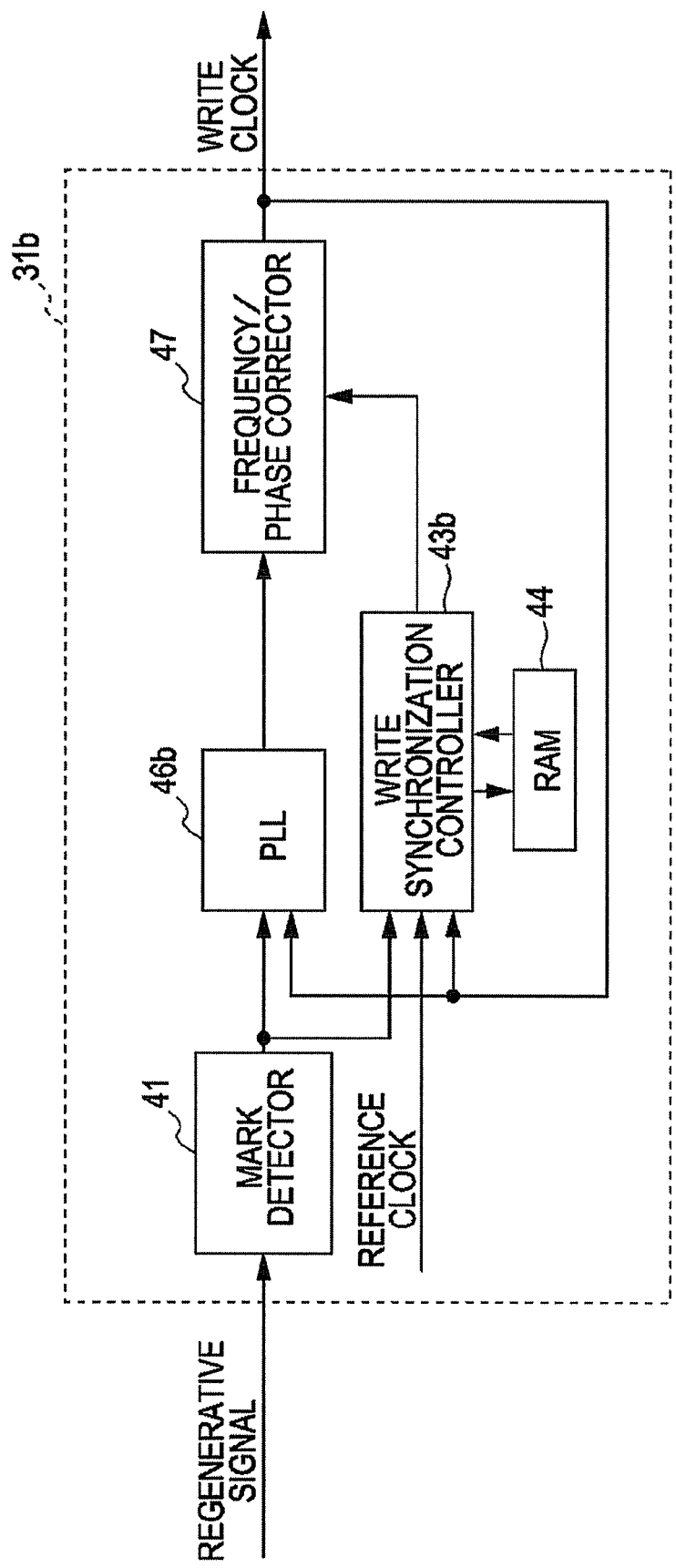
FIG. 9 is a block diagram showing an example of a structure of a write clock generator according to the second embodiment.

FIG. 9 is a block diagram showing an example of a structure of the write clock generator 31b according to the second embodiment. In FIG. 9, the same reference numeral as in FIG. 2 denotes the same or equivalent element illustrated in FIG. 2, so that description thereof will be omitted here. As compared with the write clock generator 31a, the write clock generator 31b is equipped with a write synchronization controller 43b in stead of the write synchronization controller 43a, is equipped with a PLL 46b instead of the PLL 46a, is newly equipped with a frequency/phase compensator 47, and is not equipped with the pseudo synchronization generator 42 and the selector 45.

Further, a variation measurement processing of the embodiment is the same as that of the first embodiment. However, a correction value calculated by the variation measurement processing of the embodiment and stored in the RAM 44 is correction values of the frequency and phase of a write clock.

Next, an outline of a write clock correction processing in a write processing of the magnetic disk device according to the embodiment will be described.

Figure 10A:
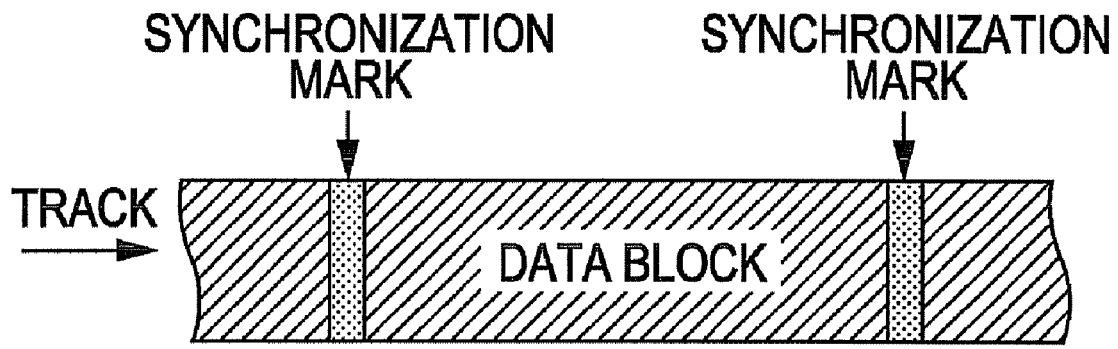
FIG. 10A and FIG. 10B are a conceptual diagram showing an example of a write clock correction processing of the magnetic disk device according to the second embodiment.
Figure 10B:
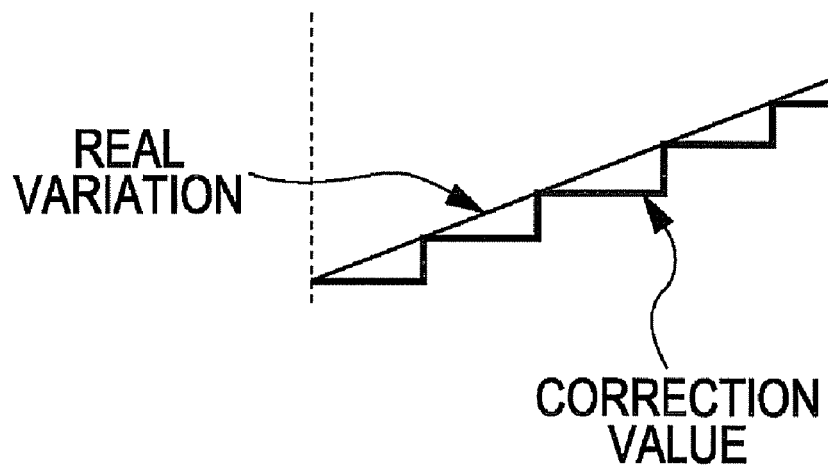

FIGS. 10A and 10B are a conceptual diagram showing an example of the write clock correction processing of the magnetic disk device according to the second embodiment. FIG. 10A is a layout drawing showing a disk pattern on the disk 22 in a track direction similarly to the first embodiment. Further, FIG. 10B is a diagram showing the variation of the frequency of the write clock with respect to a relative position of the head 21 on the disk pattern of FIG. 10A. In FIG. 10B, the lateral axis shows the relative position of the head 21, and the vertical axis shows the frequency of the write clock. In the variation measurement processing of the embodiment, the correction value is calculated for every correction timing obtained by equally dividing the data block by M, where as in the write clock correction processing of the embodiment, correction of write clock frequency and phase is performed for every correction timing.

Next, the write processing of the magnetic disk device according to the embodiment will be described.

Figure 11:
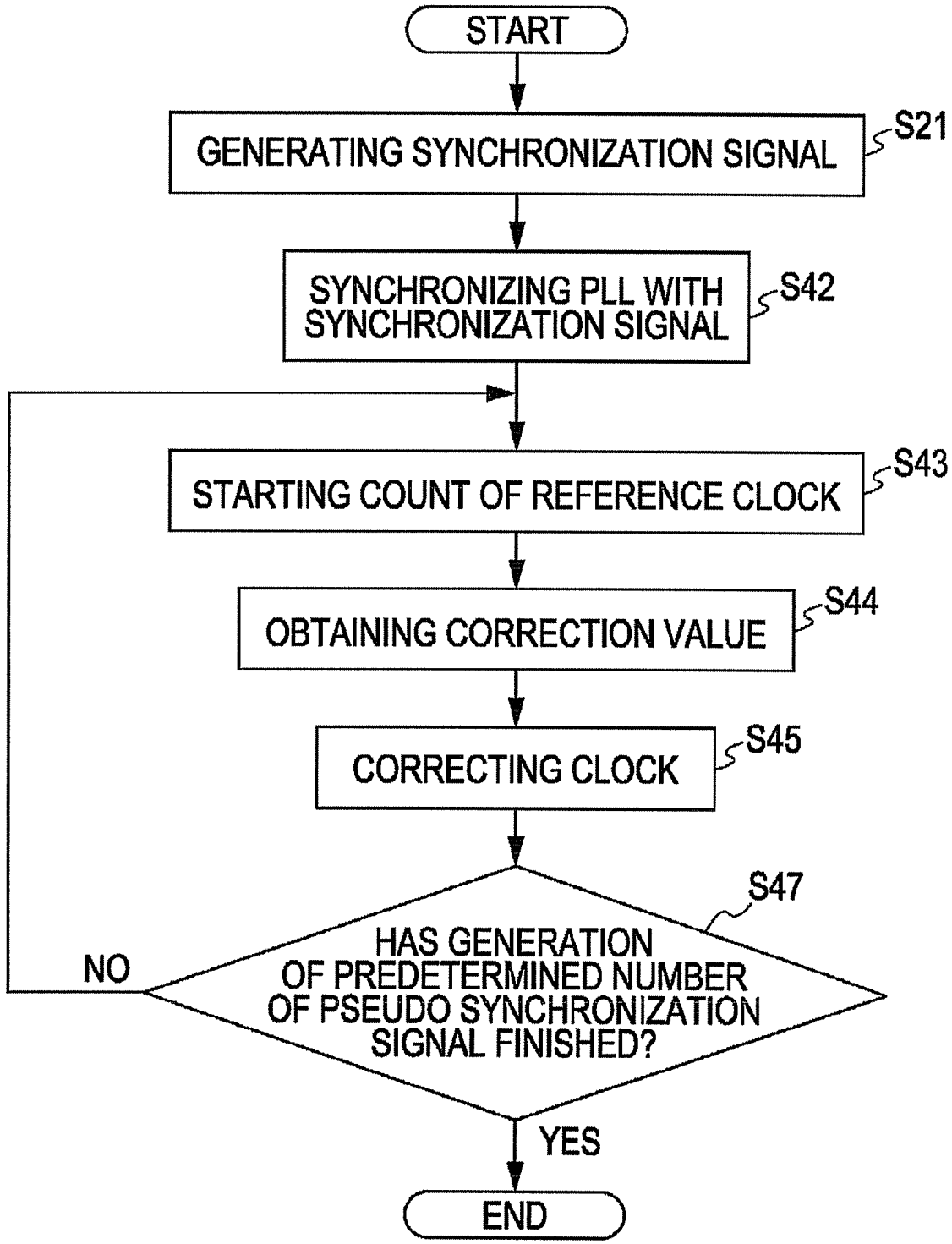
FIG. 11 is a flow chart showing an example of a write processing of the magnetic disk device according to the second embodiment.

FIG. 11 is a flow chart showing an example of the write processing of the magnetic disk device according to the second embodiment. In FIG. 11, the same reference numeral as in FIG. 7 denotes the same or equivalent process as the process illustrated in FIG. 7, so that the description thereof will be omitted here. First, the mark detector 41 performs the processing S21 similar to that of first embodiment. Next, the mark detector 41 inputs the synchronization signal to the PLL 46b and synchronizing the PLL 46b with the pulse of the synchronization signal (S42).

Next, the write synchronization controller 43b starts counting of a reference clock for a write clock correction timing (S43). Next, the write synchronization controller 43b obtains the correction value from the correction table of RAM 44 (S44). Next, the write synchronization controller 43b transmits the correction value to the frequency/phase corrector 47 when the count value is reached to a predetermined count value, and the frequency/phase corrector 47 corrects the frequency and phase of the clock output from the PLL 46b in accordance with the correction value and outputs the corrected clock as a write clock (S45).

Next, the write synchronization controller 43b performs judgment of whether or not the predetermined number (M−1) of correction is finished (S47). When the correction is not finished (No in S47), the processing goes back to S43, and the next correction is performed. When the correction is finished (Yes in S47), the flow is finished and the flow is performed again.

According to the embodiment, synchronization accuracy can be improved without increasing the number of the synchronization mark, that is, without deteriorating format efficiency by correcting the frequency and phase of the write clock by predicting frequency variation of the write clock in the data block.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An apparatus for storing data, comprising:
    a medium for storing data having a plurality of synchronization marks and a plurality of data blocks, the synchronization mark and the data block being allocated alternately in the direction of the circumference of the medium;
    a head writing data into or reading out data from the medium; and
    a processor for executing a process comprising:
        reading out synchronization marks of the medium,
        measuring time for the head to pass through each of the data blocks on the basis of signals read out from each of the synchronization marks in the direction of the circumference of the medium,
        generating write/read clock for each of the data blocks, which is at least in part continuously changing in speed, by calculating difference in time for the head to pass through the each one of the data blocks and another of the data blocks adjacent the one of the blocks on the basis of the time measured, and
        writing data into or reading out data from the medium in synchronization with the write/read clock generated.

2. The apparatus according to claim 1, wherein the generating of the process predicts the write/read clock at the plurality of timings in the data block of a target based on the measured time for the plurality of data blocks including the data block of the target, and calculates the write/read clock of each of the plurality of timings.

3. The apparatus according to claim 2, wherein the generating of the process further reads out the synchronization mark, generates the write/read clock on the basis of a timing of the reading out synchronization mark, and corrects the write/read clock by using a setting value for the plurality of timings in the data block.

4. The apparatus according to claim 3, wherein the generating of the process generates a first pulse that indicates a timing of the regenerated synchronization mark, and generates the recording clock by synchronizing a PLL with the first pulse.

5. The apparatus according to claim 4, wherein the generating of the process generates a second pulse that indicates a timing between the first pulses adjacent to each other based on the first pulses and the setting value, and generates the write/read clock by synchronizing the PLL with the first pulse and the second pulse.

6. The apparatus according to claim 5, wherein the generating of the process calculates a correction amount of a timing of the second pulse as the setting value, and corrects the timing of the second pulse based on the correction value.

7. The apparatus according to claim 5, wherein the generating of the process calculates a predetermined number of the setting values for every data block, and generates the predetermined number of second pulse between the first pulses adjacent to each other.

8. The apparatus according to claim 4, wherein the generating of the process corrects the write/read clock on the based of the setting value at a predetermined timing between the first pulses adjacent to each other.

9. The apparatus according to claim 8, wherein the generating of the process calculates a correction value of a phase of the write/read clock as the setting value, and the generating module corrects the phase of the write/read clock based on the correction value.

10. The apparatus according to claim 8, wherein the predetermined timing is a timing that is obtained by equally dividing the interval between the first pulses adjacent to each other by a predetermined number.

11. A method for controlling an apparatus for storing data, the apparatus including a medium for storing data having a plurality of synchronization marks and a plurality of data blocks, the synchronization mark and the data block being allocated alternately in the direction of the circumference of the medium, a head writing data into or reading out data from the medium, the method comprising:
    reading out synchronization marks of the medium,
    measuring time for the head to pass through each of the data blocks on the basis of signals read out from each of the synchronization marks in the direction of the circumference of the medium,
    generating write/read clock for each of the data blocks, which is at least in part continuously changing in speed, by calculating difference in time for the head to pass through the each one of the data blocks and another of the data blocks adjacent the one of the blocks on the basis of the time measured, and
    writing data into or reading out data from the medium in synchronization with the write/read clock generated.

* * * * *

UNITED STATES PATENT AND TRADEMARK OFFICE
CERTIFICATE OF CORRECTION

PATENT NO. : 8,102,615 B2  
APPLICATION NO. : 12/409636  
DATED : January 24, 2012  
INVENTOR(S) : Itakura et al.

Page 1 of 1

It is certified that error appears in the above-identified patent and that said Letters Patent is hereby corrected as shown below:

Column 8, Line 26, in Claim 8, delete "based" and insert -- basis --, therefore.

Signed and Sealed this
Fifteenth Day of May, 2012

David J. Kappos
*Director of the United States Patent and Trademark Office*